(12) United States Patent
Nam et al.

(10) Patent No.: US 7,953,273 B2
(45) Date of Patent: May 31, 2011

(54) APPARATUS AND METHOD FOR MODIFYING ARRANGEMENT OF COLORS

(75) Inventors: Gun-woo Nam, Seongnam-si (KR); Du-sik Park, Suwon-si (KR); Young-shin Kwak, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 979 days.

(21) Appl. No.: 11/782,294

(22) Filed: Jul. 24, 2007

(65) Prior Publication Data

US 2008/0025600 A1   Jan. 31, 2008

(30) Foreign Application Priority Data

Jul. 26, 2006 (KR) .................. 10-2006-0070379
Nov. 21, 2006 (KR) .................. 10-2006-0115375

(51) Int. Cl.
*G06K 9/34* (2006.01)
*G06K 9/36* (2006.01)
(52) U.S. Cl. .................... 382/164; 382/166
(58) Field of Classification Search .......... 382/162, 382/167–8, 164
See application file for complete search history.

(56) References Cited

U.S. PATENT DOCUMENTS

| 6,128,407 A * | 10/2000 | Inoue et al. .......... 382/167 |
| 2002/0097906 A1 * | 7/2002 | Ishiyama .......... 382/154 |
| 2003/0002736 A1 * | 1/2003 | Maruoka et al. .......... 382/168 |

FOREIGN PATENT DOCUMENTS

| JP | 9-214792 | 8/1997 |
| JP | 2001-331809 | 11/2001 |
| JP | 2005-346621 | 12/2005 |
| KR | 2005-64279 | 6/2005 |

* cited by examiner

*Primary Examiner* — Hadi Akhavannik
(74) *Attorney, Agent, or Firm* — Staas & Halsey LLP

(57) ABSTRACT

An apparatus and method for modifying an arrangement of colors of an input image to satisfy a user preference in consideration of color composition of the input image, the apparatus including: an extraction unit extracting one or more dominant colors from an input image; a center-of-gravity calculation unit calculating a first position of a center of gravity based on a position of each dominant color in a color space; a parameter calculation unit calculating a parameter for modifying the color arrangement of the input image based on the first position and a second position to which the center of gravity is moved from the first position according to a predetermined standard; and a control unit modifying the color arrangement of the input image according to the parameter.

31 Claims, 12 Drawing Sheets

| ADJECTIVE ITEM | | COORDINATES |
|---|---|---|
| CLEAR | MERRY | $[X_{11}, Y_{11}, Z_{11}], [X_{12}, Y_{12}, Z_{12}], [X_{13}, Y_{13}, Z_{13}], [X_{14}, Y_{14}, Z_{14}]$ ... |
| | SWEET | $[X_{21}, Y_{21}, Z_{21}], [X_{22}, Y_{22}, Z_{22}], [X_{23}, Y_{23}, Z_{23}], [X_{24}, Y_{24}, Z_{24}]$ ... |
| | .. | .. |
| MILD | PURE | $[X_{31}, Y_{31}, Z_{31}], [X_{32}, Y_{32}, Z_{32}], [X_{33}, Y_{33}, Z_{33}], [X_{34}, Y_{34}, Z_{34}]$ ... |
| | SIMPLE | $[X_{41}, Y_{41}, Z_{41}], [X_{42}, Y_{42}, Z_{42}], [X_{43}, Y_{43}, Z_{43}], [X_{44}, Y_{44}, Z_{44}]$ ... |
| | STABLE | $[X_{51}, Y_{51}, Z_{51}], [X_{52}, Y_{52}, Z_{52}], [X_{53}, Y_{53}, Z_{53}], [X_{54}, Y_{54}, Z_{54}]$ ... |
| | .. | .. |
| NATURAL | RURAL | $[X_{61}, Y_{61}, Z_{61}], [X_{62}, Y_{62}, Z_{62}], [X_{63}, Y_{63}, Z_{63}], [X_{64}, Y_{64}, Z_{64}]$ ... |
| | COMFORTABLE | $[X_{71}, Y_{71}, Z_{71}], [X_{72}, Y_{72}, Z_{72}], [X_{73}, Y_{73}, Z_{73}], [X_{74}, Y_{74}, Z_{74}]$ ... |
| .. | | |

| 5 | 5 | 7 | 7 | 7 | 7 | 7 | 7 | 5 | 7 | 7 |
|---|---|---|---|---|---|---|---|---|---|---|
| 5 | 7 | 7 | 7 | 7 | 9 | 7 | 7 | 1 | 7 | 5 |
| 7 | 7 | 12 | 5 | 7 | 5 | 12 | 7 | 7 | 1 | 1 |
| 7 | 6 | 12 | 1 | 6 | 1 | 1 | 7 | 7 | 1 | 1 |
| 6 | 6 | 12 | 6 | 6 | 6 | 6 | 6 | 6 | 6 | 6 |
| 6 | 6 | 12 | 6 | 6 | 6 | 6 | 6 | 6 | 6 | 6 |
| 6 | 12 | 12 | 6 | 6 | 6 | 6 | 6 | 6 | 6 | 6 |
| 8 | 12 | 8 | 8 | 10 | 10 | 10 | 8 | 8 | 8 | 8 |

C $(X_{COG}, Y_{COG}, Z_{COG})$ : CENTER OF GRAVITY
D1 $(X_1, Y_1, Z_1)$ : FIRST DOMINANT COLOR
D2 $(X_2, Y_2, Z_2)$ : SECOND DOMINANT COLOR
D3 $(X_3, Y_3, Z_3)$ : THIRD DOMINANT COLOR

FIG. 8D

C $(X_{COG}, Y_{COG}, Z_{COG})$ : CENTER OF GRAVITY
D1 $(X_1, Y_1, Z_1)$ : FIRST DOMINANT COLOR
D2 $(X_2, Y_2, Z_2)$ : SECOND DOMINANT COLOR
D3 $(X_3, Y_3, Z_3)$ : THIRD DOMINANT COLOR

FIG. 10

APPARATUS AND METHOD FOR MODIFYING ARRANGEMENT OF COLORS

CROSS-REFERENCE TO RELATED APPLICATIONS

This application claims the benefit of Korean Application No. 2006-70379 and 2006-115375 filed on Jul. 26, 2006 and Nov. 21, 2006, respectively, in the Korean Intellectual Property Office, the disclosures of which are incorporated herein by reference.

BACKGROUND OF THE INVENTION

1. Field of the Invention

Aspects of the present invention relate to an apparatus and method for modifying an arrangement of colors, and more particularly, to an apparatus and method for modifying arrangement of colors capable of modifying the overall color arrangement of an input image to satisfy a user preference in consideration of a color composition of the input image.

2. Description of the Related Art

To meet the increasing demand of users to directly handle digital content recorded using handheld devices (such as digital cameras or camcorders), a color arrangement apparatus and method have been introduced to help users easily select colors to be used in documents or images when the users create the documents or images.

The conventional color arrangement apparatus receives one or more base colors input by a user, selects colors corresponding to the input base colors, and arranges the selected colors so as to be used in a document or an image. For example, if blue is selected as the color of characters contained in a document, the conventional color arrangement apparatus selects a color that matches well with the blue characters (for example, white) as a background color.

The conventional color arrangement apparatus focuses on making a harmonious color arrangement of an uncolored document or image and enabling a user to easily select colors that will be used in a document or an image when the user creates the document or the image. However, the conventional color arrangement apparatus fails to suggest an appropriate method of modifying the overall color arrangement of a document or an image that contains color information according to a user preference.

Therefore, a technology for adjusting, in an integrated manner, the overall color arrangement of a document or an image that contains color information according to a user preference is needed.

SUMMARY OF THE INVENTION

Aspects of the present invention provide an apparatus and method for modifying an arrangement of colors, the apparatus and method capable of modifying the overall color arrangement of an input image to satisfy a user preference in consideration of color composition of the input image.

According to an aspect of the present invention, there is provided an apparatus for modifying an arrangement of colors of an input image, the apparatus including: an extraction unit to extract one or more dominant colors from an input image; a center-of-gravity calculation unit to calculate a first position of a center of gravity based on a position of each dominant color in a color space; a parameter calculation unit to calculate a parameter for modifying a color arrangement of the input image based on the first position and a second position to which the center of gravity is moved from the first position according to a predetermined standard; and a control unit to modify the color arrangement of the input image according to the parameter.

According to another aspect of the present invention, there is provided a method of modifying an arrangement of colors in an input image, the method including: extracting one or more dominant colors from an input image; calculating a first position of a center of gravity based on a position of each dominant color in a color space; calculating a parameter for modifying a color arrangement of the input image based on the first position and a second position to which the center of gravity is moved from the first position according to a predetermined standard; and modifying the color arrangement of the input image according to the parameter.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, an apparatus and method for modifying arrangement of colors according to aspects of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create methods and/or devices for implementing the functions specified in the flowchart block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instructions that implement the function or functions specified in the flowchart block or blocks.

The computer program instructions may also be loaded onto a computer or other programmable data processing apparatus to cause a series of operations to be performed on the computer or other programmable apparatus to produce a computer-implemented process such that the instructions that execute on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

An apparatus for modifying an arrangement of colors according to an embodiment of the present invention receives digital content containing color information and modifies the overall color arrangement of the received digital content to satisfy a user preference. To this end, the apparatus statistically analyzes the color information contained in the received digital content and calculates a parameter required to modify the color arrangement of the received digital content according to the user preference based on the analysis result. Then, the apparatus modifies the overall color arrangement of the received digital content based on the calculated parameter and provides the digital content with a new color arrangement to the user. The apparatus may be understood as an apparatus including a module that can display an image. For example, the apparatus may be a digital television (TV), a personal digital assistant (PDA), a settop box, or a mobile phone.

Hereinafter, an apparatus for modifying an arrangement of colors according to aspects of the present invention will be described in detail with reference to FIGS. 1 through 8D.

Figure 1:
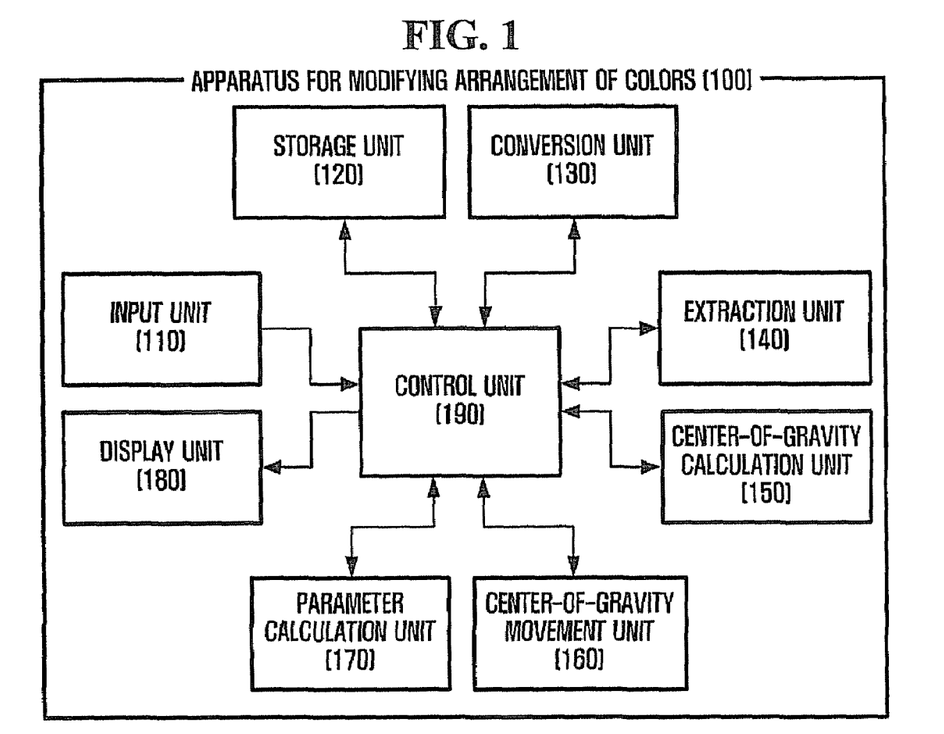
FIG. 1 is a block diagram of an apparatus for modifying an arrangement of colors according to an embodiment of the present invention.

FIG. 1 is a block diagram of an apparatus 100 for modifying an arrangement of colors according to an embodiment of the present invention. Referring to FIG. 1, the apparatus 100 includes an input unit 110, a storage unit 120, a conversion unit 130, an extraction unit 140, a center-of-gravity calculation unit 150, a center-of-gravity movement unit 160, a parameter calculation unit 170, a display unit 180, and a control unit 190.

The input unit 110 receives digital content containing color information. Examples of the digital content include a document and an image (a still image or a moving image). Hereinafter, an image containing color information will be described as an example of the digital content. However, it is understood that aspects of the present invention are not limited thereto. That is, in addition to documents or images, aspects of the present invention may be applied to all digital content containing color information. The input unit 110 also receives user commands. For example, the user commands may include a command for displaying adjective items corresponding to an impression effect of an input image, a command for selecting an item from the displayed items, and a command for modifying the color arrangement of the input image according to the selected item.

The storage unit 120 may store one or more of an algorithm for converting a signal format of the image input through the input unit 110, an algorithm for analyzing color distribution of the input image, and an algorithm for calculating a parameter required to modify the color arrangement of the input image. The storage unit 120 may be a nonvolatile memory device (such as a read-only memory (ROM), a programmable read-only memory (PROM), an erasable programmable read-only memory (EPROM), an electrically erasable programmable read-only memory (EEPROM), or a flash memory), a volatile memory device (such as a random access memory (RAM)), or a storage medium (such as a hard disk drive). However, it is understood that aspects of the present invention are not limited thereto.

The conversion unit 130 converts the signal format of the input image provided by the input unit 110. For example, if the signal format of the input image is a red, green, and blue (RGB) signal format, the conversion unit 130 converts the RGB signal format of the input image into another format (e.g., a commission Internationale de l'Eclairage (CIE) lightness, chroma and hue (LCH) (L*C*h) format) in which the input image is divided into a luminance signal and a color signal. That is, the conversion unit 130 redefines the input image in a CIE LCH (L*C*h) color space. However, it is understood that the conversion unit 130 may redefine the input image as any format in which the input image is divided into a luminance signal and a color signal.

Figure 2:
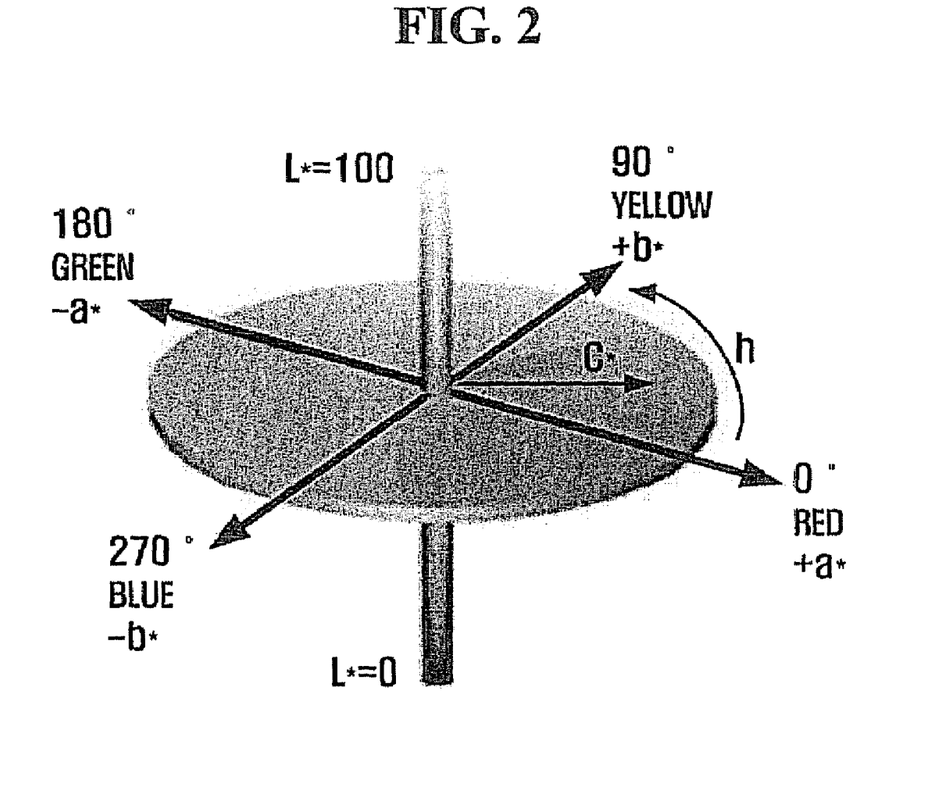
FIG. 2 illustrates coordinates of colors represented in a commission Internationale de l'Eclairage (CIE) lightness, chroma and hue (LCH) (L*C*h) color space applied to an embodiment of the present invention.

The CIE LCH (L*C*h) color space is one of standard color systems established by the CIE and represents red (R), green (G), and blue (B), which are three primary colors of light, as quantities of X, Y, and Z. The CIE LCH color space uses the same diagram as a CIE LAB color space (in the CIE LAB color space, color coordinates are indicated by L*, a*, b*, where L* indicates lightness, a* indicates the degree of red and green, and b* indicates the degree of yellow and blue). In addition, the CIE LCH color space uses cylindrical coordinates (as illustrated in FIG. 2) instead of square coordinates. In the CIE LCH color space, L* indicates lightness and C* indicates chroma, which is represented by the distance from the center of a globe to an outer circumference of the globe. In addition, h indicates hue and is represented by an angle between 0 and 360 degrees. 0 degrees indicates red, 90 degrees indicates yellow, 180 degrees indicates green, 270 degrees indicates blue, and 360 degrees (i.e., 0 degrees) indicates red.

Figure 4:
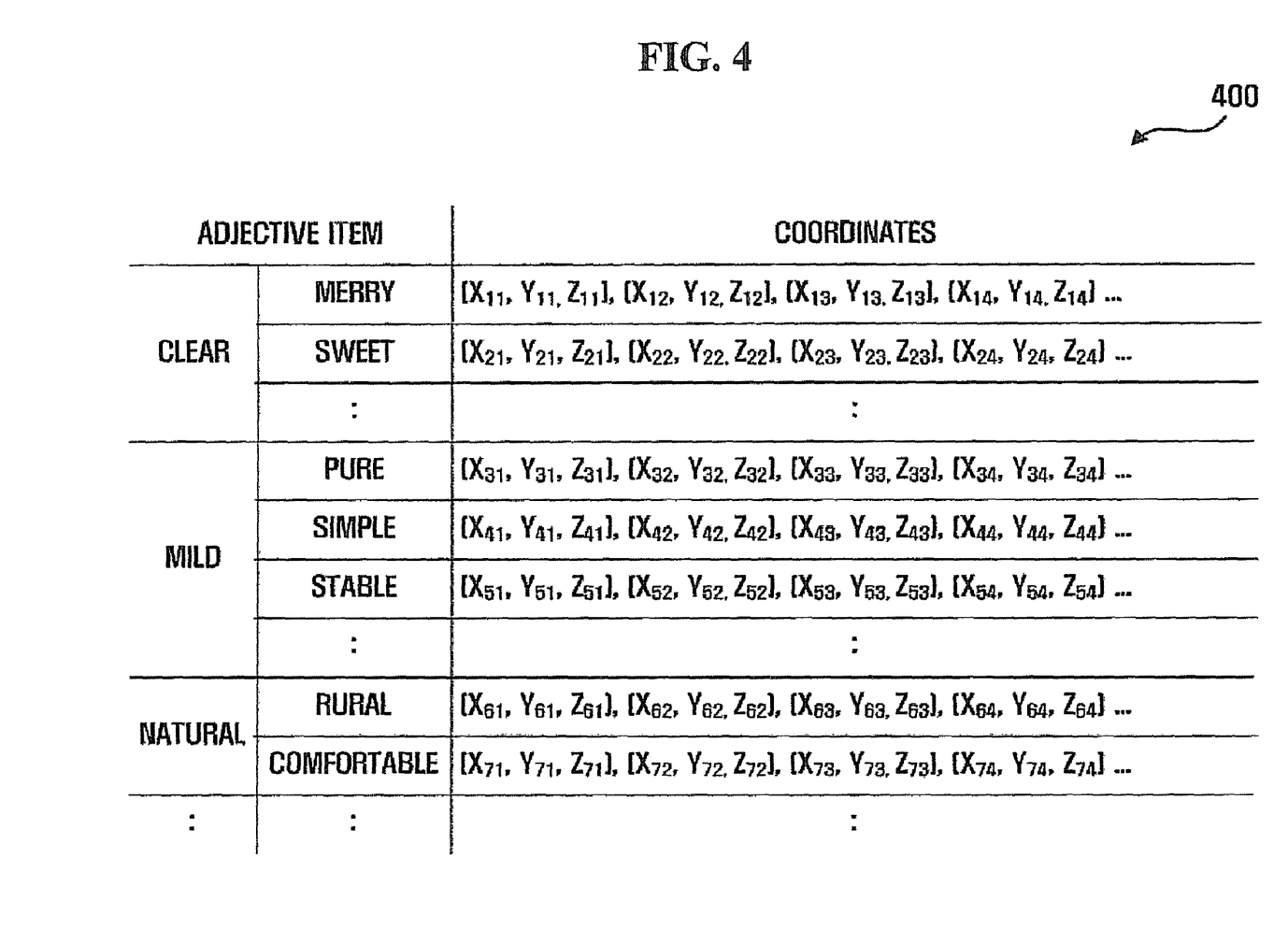
FIG. 4 shows a mapping table according to an embodiment of the present invention.

In the present embodiment, the CIE LCH color space may be divided into a plurality of subspaces respectively corresponding to a plurality of adjectives. For example, the CIE LCH color space may be divided into a plurality of subspaces respectively corresponding to adjectives such as 'clear,' 'mild,' 'natural,' 'cute,' 'cheerful,' 'elegant,' 'splendid,' 'subdued,' 'dynamic,' 'soft,' 'gentle,' and 'modern.' In addition, each subspace may be subdivided into one or more spaces. For example, a subspace corresponding to the adjective 'mild' may be divided into spaces respectively corresponding to adjectives such as 'pure,' 'simple,' 'stable,' and 'flexible.' Adjectives respectively corresponding to the subspaces and coordinate information included in the subspaces form a mapping table 400 (as illustrated in FIG. 4). The storage unit 120, described above, may store the mapping table 440.

Referring back to FIG. 1, the extraction unit 140 extracts dominant colors from the input image. Here, the extraction unit 140 may extract the dominant colors using various methods. For example, the extraction unit 140 may create a color histogram of the input image using the color information of the input image and extract the dominant colors from the input image based on the color histogram.

Figure 5:
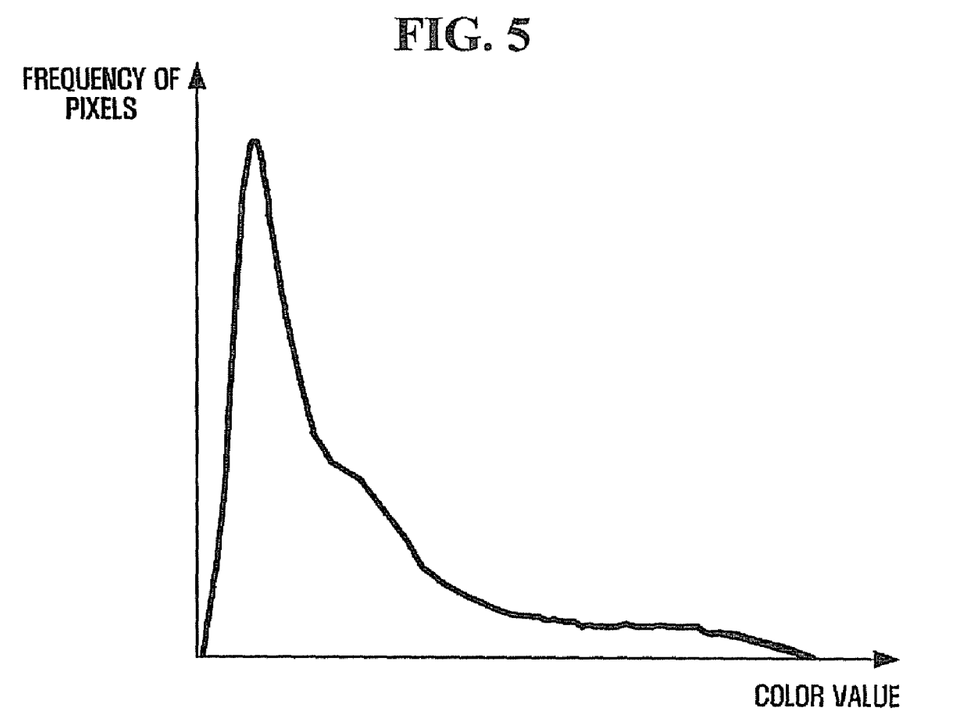
FIG. 5 illustrates a color histogram of an input image according to an embodiment of the present invention.

FIG. 5 illustrates a color histogram of an input image according to an embodiment of the present invention. A horizontal axis of the color histogram indicates color values of pixels that form the input image. A vertical axis of the color histogram indicates frequency of pixels having each color value.

Referring back to FIG. 1, the extraction unit 140 may select colors whose frequency of pixels is greater than a predetermined threshold value in the color histogram of FIG. 5 as dominant colors. Alternatively, the extraction unit 140 may select a predetermined number of colors in order of highest frequency of pixels to lowest frequency of pixels and extract the selected colors as the dominant colors. For example, if the predetermined number of colors is three, the extraction unit 140 may extract the three colors having the highest frequency of pixels in the color histogram as the dominant colors.

In addition, the extraction unit 140 may divide the input image into a plurality of sub-regions, each including one or more pixels, analyze color distribution of each sub-region, and extract dominant colors based on the analysis result. A detailed description of this extraction method will now be made with reference to FIGS. 6A through 6C.

Figure 6A:
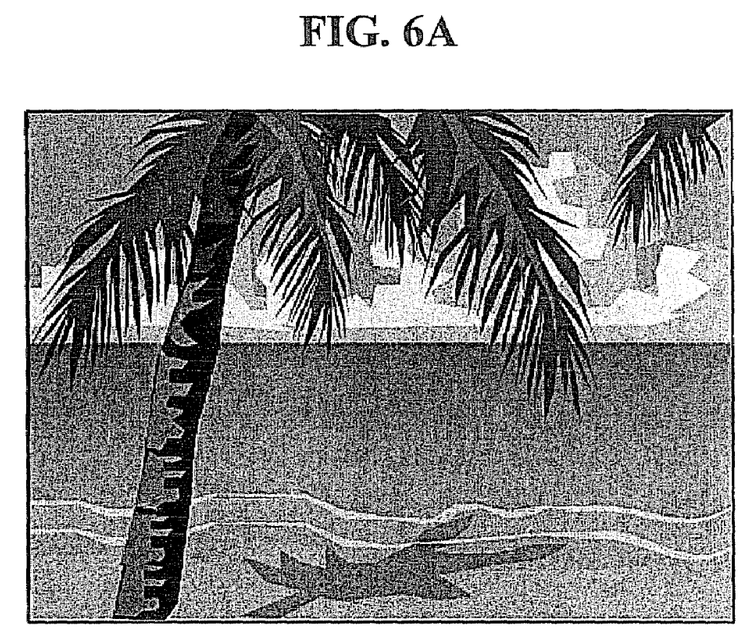
FIGS. 6A through 6C are views explaining a method of extracting dominant colors according to an embodiment of the present invention.
Figure 6B:
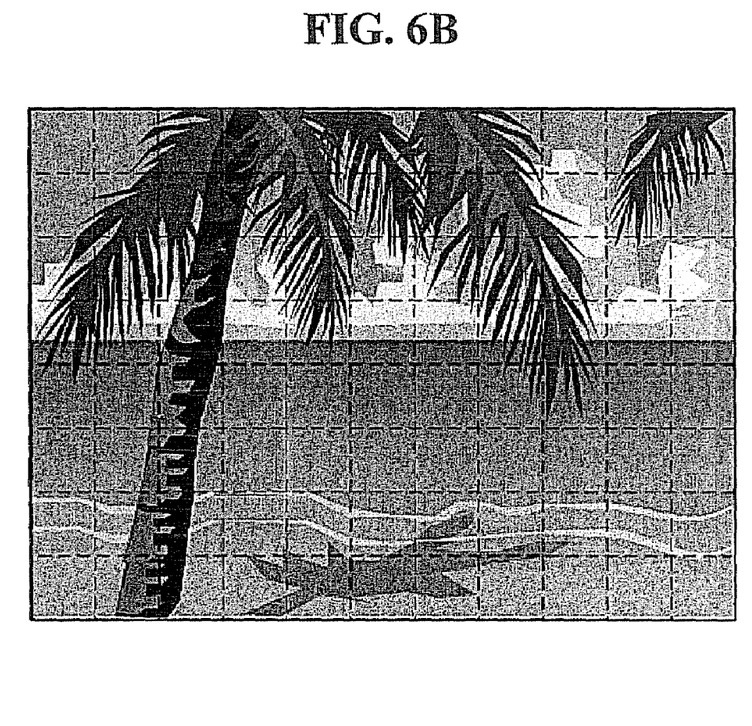
Figure 6C:
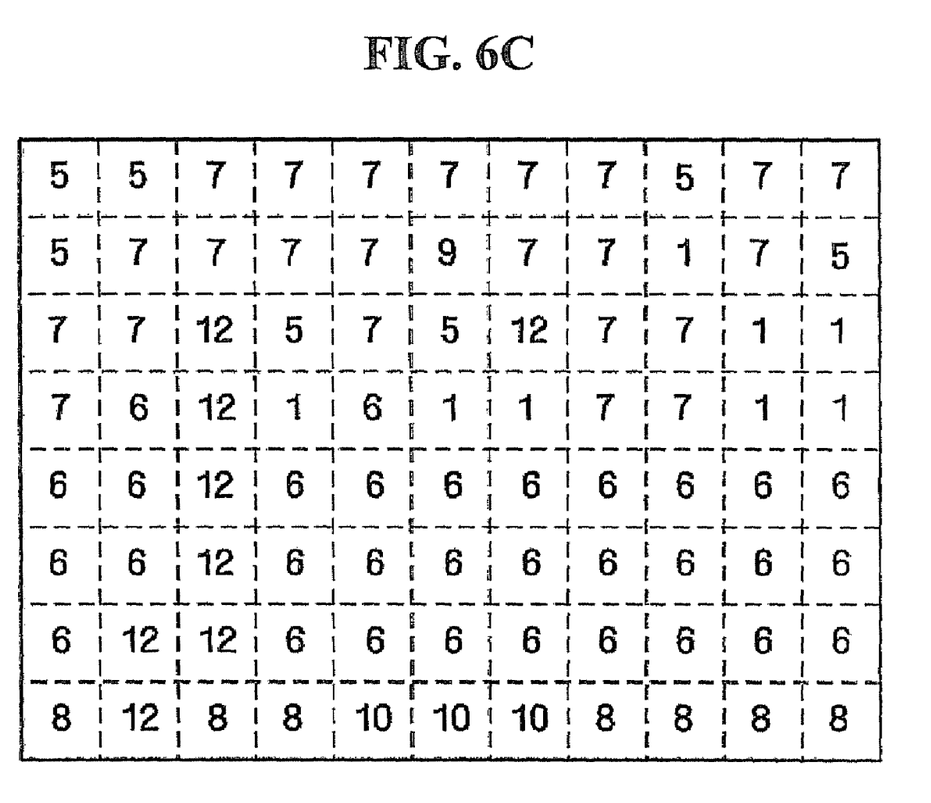

FIG. 6A illustrates an example of an input image. FIG. 6B illustrates the input image of FIG. 6A divided in a matrix form. The extraction unit 140 detects a color of each pixel in a sub-region from the image illustrated in FIG. 6B. Then, the extraction unit 140 selects a main color representing the sub-region based on the detection results. The extraction unit 140 may select the main color using various methods. For example, the extraction unit 140 may select a color having a highest frequency of pixels among detected colors in the sub-region as the main color of the sub-region. Alternatively, the extraction unit 140 may select a color corresponding to an average value of the detected colors in the sub-region as the main color of the sub-region. The extraction unit 140 may also select a color corresponding to a median value of the detected colors in the sub-region as the main color of the sub-region. It is understood that, according to aspects of the present invention, other methods than those described above may be used to select the main color of each sub-region. The main color selected is mapped to the sub-region as illustrated in FIG. 6C.

If a main color is mapped to each corresponding sub-region, the extraction unit 140 determines whether a proportion of the entire input image occupied by sub-regions that, for example, have an identical main color and are arranged continuously is greater than a predetermined threshold rate (e.g., 10%). If the proportion of the sub-regions that, for example, have an identical main color and are arranged continuously in the entire input image is greater than the predetermined threshold rate, the extraction unit 140 extracts the identical main color as a dominant color. For example, if a main color is mapped to each corresponding sub-region as illustrated in FIG. 6C, a proportion of the entire image occupied by a region in which sub-regions having a main color corresponding to '6' are continuously arranged is greater than 10%. Therefore, the extraction unit 140 extracts the main color corresponding to '6' as a dominant color. On the other hand, a proportion of the entire image occupied by a region in which sub-regions having a main color corresponding to '10' are continuously arranged is less than, for example, 10%. Therefore, the extraction unit 140 excludes the main color corresponding to '10' from the dominant colors. Dominant colors extracted using the above method may be represented by coordinates in a color space. The coordinates represented in the color space may form a line segment, a figure, or a solid figure. It is understood that other methods may be used to extract the dominant colors from a mapping of main colors to sub-regions. For example, one or more of the most common main colors mapped to the sub-regions may be selected as the dominant colors.

The center-of-gravity calculation unit 150 calculates a position of a center of gravity based on a position of each dominant color in the color space. Here, the center-of-gravity calculation unit 150 may apply a weight to each dominant color according to a proportion of each dominant color in an entire region occupied by the dominant colors. For example, it is assumed that the extraction unit 140 has extracted n dominant colors. In this case, if coordinates of an $n^{th}$ dominant color in a color space are $(X_n, Y_n, Z_n)$ and a region occupied by the $n^{th}$ dominant color in an entire region of an input image is Sn, coordinates $(X_{COG}, Y_{COG}, Z_{COG})$ of a center of gravity C of the $n^{th}$ dominant color are given by Equation (1):

$$X_{COG} = \frac{(X_1 S_1) + (X_2 S_2) + \ldots + (X_n S_n)}{(S_1 + S_2 + \ldots + S_n)},$$
$$Y_{COG} = \frac{(Y_1 S_1) + (Y_2 S_2) + \ldots + (Y_n S_n)}{(S_1 + S_2 + \ldots + S_n)},$$
$$Z_{COG} = \frac{(Z_1 S_1) + (Z_2 S_2) + \ldots + (Z_n S_n)}{(S_1 + S_2 + \ldots + S_n)}.$$

The coordinates of the center of gravity calculated using Equation (1) may be located within a line segment, a polygon, or a solid figure formed by coordinates of each dominant color in the color space. The center of gravity may be understood as an indicator indicating the overall impression of the input image. Moving the position of the center of gravity may denote changing the overall impression of the input image. A range within which the position of the center of gravity can be moved (hereinafter, referred to as a movement range) may be predetermined. The movement range of the center of gravity may be limited in order to prevent an excessive change to the impression of the input image.

When receiving a command to modify the color arrangement of the input image according to a selected adjective, the center-of-gravity movement unit 160 moves the center of gravity inside a subspace corresponding to the selected adjective. Moving the position of the center of gravity will now be described in more detail with reference to FIGS. 7 through 8D.

Figure 7:
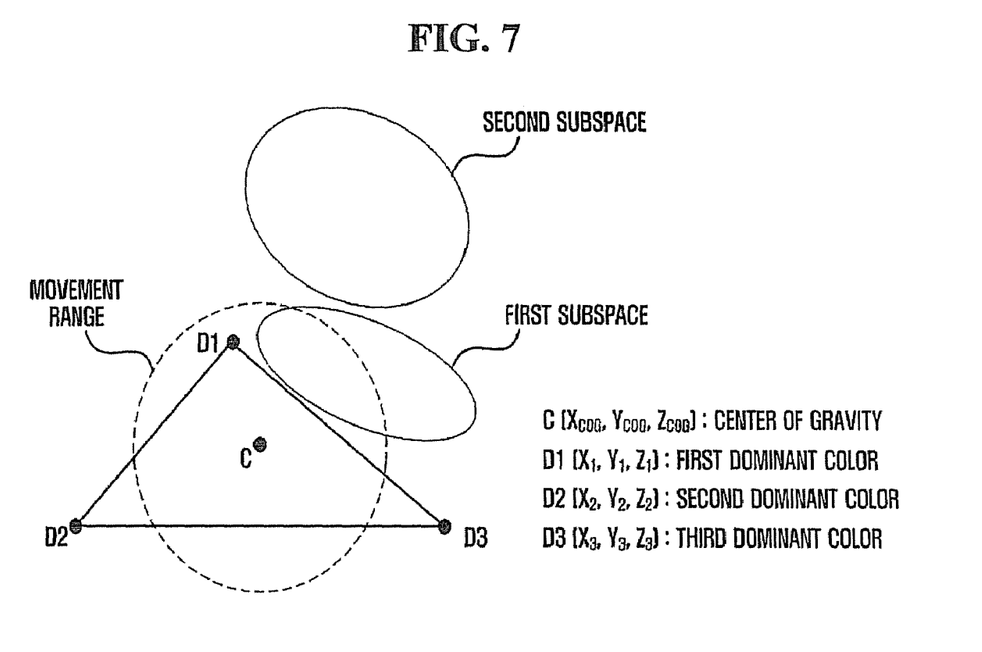
FIG. 7 illustrates part of a color space.

FIG. 7 illustrates part of a color space. Referring to FIG. 7, a first subspace corresponds to an adjective 'soft,' and a second subspace corresponds to an adjective 'natural.'

First, the center-of-gravity movement unit 160 calculates edge coordinates of a predetermined movement range using coordinates of a center of gravity and the predetermined movement range of the center of gravity. After calculating the edge coordinates of the movement range, the center-of-gravity movement unit 160 can identify coordinates within the movement range.

Figure 8A:
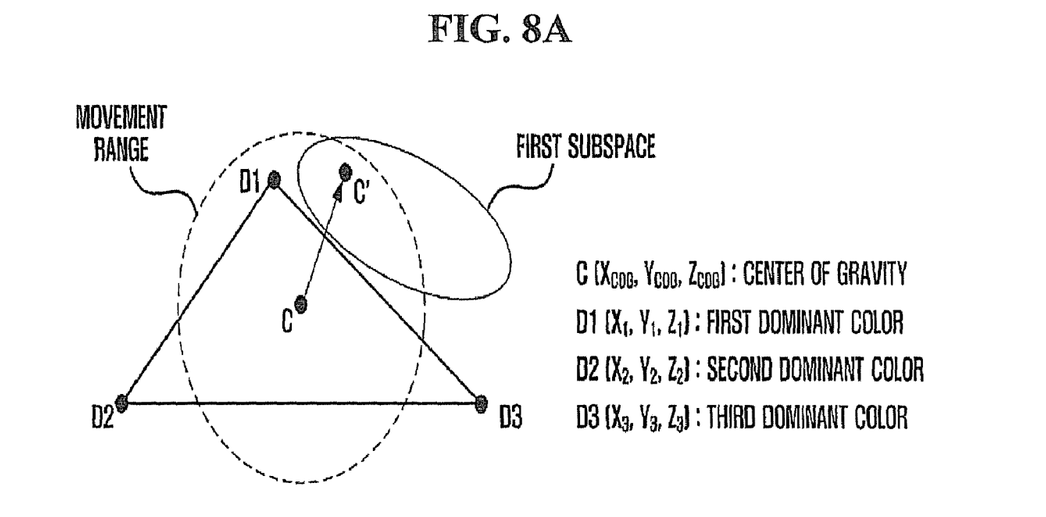
FIGS. 8A through 8D are diagrams explaining a method of moving a center of gravity according to an embodiment of the present invention.

Next, the center-of-gravity movement unit 160 determines whether there is an overlapping region between a subspace corresponding to a selected adjective and the movement range of the center of gravity. If the center-of-gravity movement unit 160 determines that there is the overlapping region, the center-of-gravity movement unit 160 moves the center of gravity to a position within the overlapping region. For example, referring to FIG. 7, if the adjective 'soft' is selected, there is an overlapping region between the movement range of the center of gravity and the first subspace. Therefore, the center-of-gravity movement unit 160 determines a position within the overlapping region to be a new position of the center of gravity, and moves the center of gravity to the new position, as illustrated in FIG. 8A.

Figure 8B:
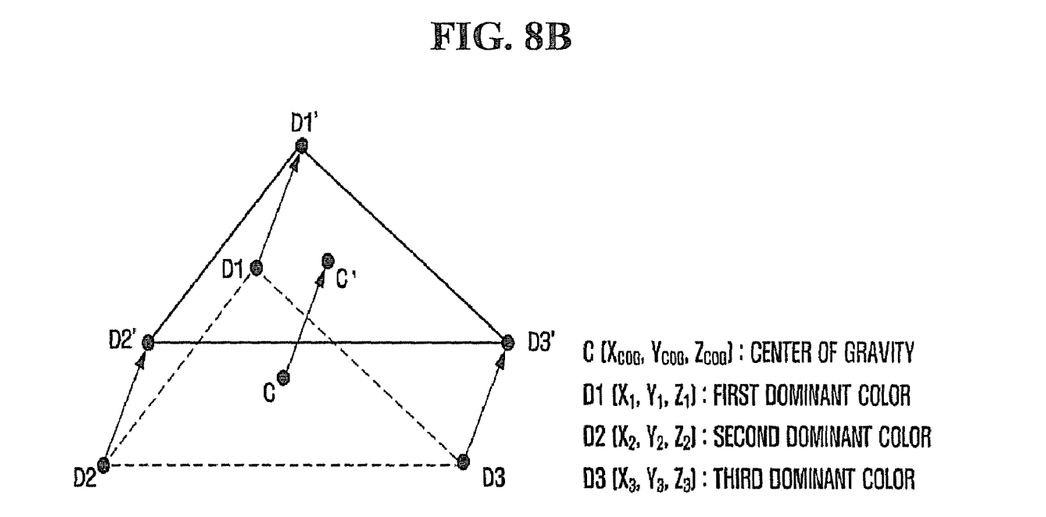
Figure 8C:
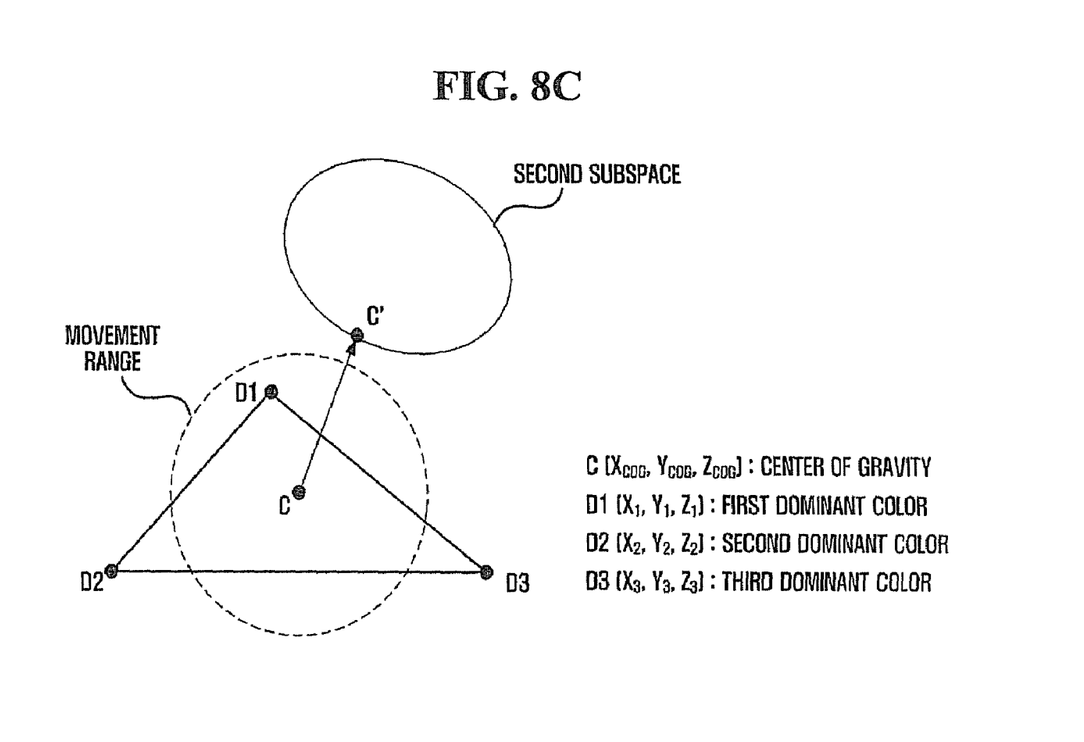

If the center-of-gravity movement unit 160 determines that there is no overlapping region between the subspace corresponding to the selected adjective and the movement range of the center of gravity, the center-of-gravity movement unit 160 may move the center of gravity to a position in the subspace located a minimum possible distance away from a current position of the center of gravity. For example, referring to FIG. 7, if the adjective 'natural' is selected, there is no overlapping region between the movement range of the center of gravity and the second subspace. Therefore, the center-of-gravity movement unit 160 moves the center of gravity to a position C' in the second subspace that is located a minimum distance away from the current position C of the center of gravity, as illustrated in FIG. 8C.

Referring back to FIG. 1, the parameter calculation unit 170 calculates a motion vector indicating a position change of the center of gravity. Specifically, if coordinates of the current center of gravity C are $(X_{COG}, Y_{COG}, Z_{COG})$ and coordinates of a new center of gravity C' are $(X_{COG'}, Y_{COG'}, Z_{COG'})$, coordinates (dX, dY, dZ) of the motion vector may be calculated using $$\text{Motion vector} = (dX, dY, dZ) \qquad \text{Equation (2)}$$
$$= (X_{COG} - X_{COG'}, Y_{COG} - Y_{COG'}, Z_{COG} - Z_{COG'}).$$

If the new position of the center of gravity exists within the predetermined movement range, coordinates of the motion vector of the center of gravity may be calculated using Equation (2). If the new position of the center of gravity is outside the predetermined movement range (such as illustrated in FIG. 8C), the coordinates of the motion vector may be calculated using Equation (3):

$$\text{Motion vector} = \frac{K \times (dX, dY, dZ)}{\text{MAX}(dX, dY, dZ)}$$

where MAX(dX, dY, dZ) indicates a maximum value among dX, dY, and dZ, and K indicates a movement range of the center of gravity.

The motion vector calculated by the parameter calculation unit 170 may be used as a parameter for modifying the overall color arrangement of the input image.

Figure 8D:
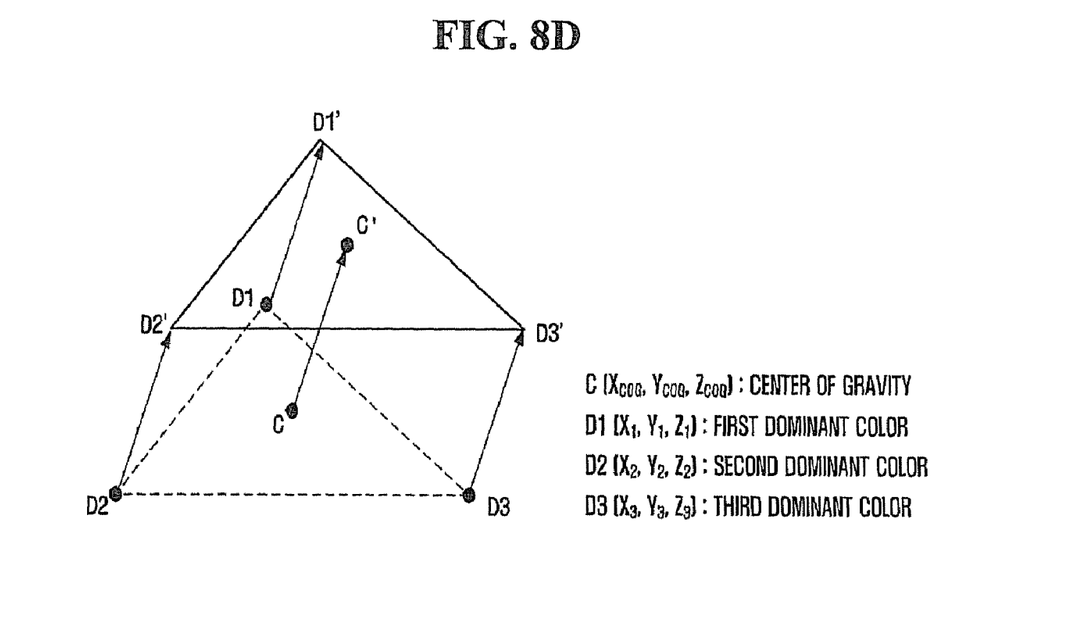

The control unit 190 modifies the overall color arrangement of the input image by moving the position of each dominant color in the color space according to the parameter (i.e., the motion vector) calculated by the parameter calculation unit 170. For example, if the position of the center of gravity is moved as illustrated in FIG. 8B, the control unit 190 moves the position of each dominant color by the distance and in the direction that the center of gravity has been moved as illustrated in FIG. 8B. If the position of the center of gravity is moved as illustrated in FIG. 8C, the control unit 190 moves the position of each dominant color by the distance and in the direction that the center of gravity has moved as illustrated in FIG. 8D. Consequently, the overall color arrangement of the input image is modified to correspond to the selected adjective.

The display unit 180 displays a command processing input in a visible form. For example, the display unit 180 may display a user interface to receive a selection value for an adjective among adjectives corresponding to a plurality of subspaces, or display an image whose color arrangement has been changed by the control unit 190. Various displays, such as liquid crystal displays (LCDs), plasma display panels (PDPs), organic light emitting diodes (OLEDs), and flexible displays, may be used as the display unit 180. The display unit 180 may be implemented independently of the input unit 110, or integrated into the input unit 110 (such as in the case of a touch screen).

Figure 9:
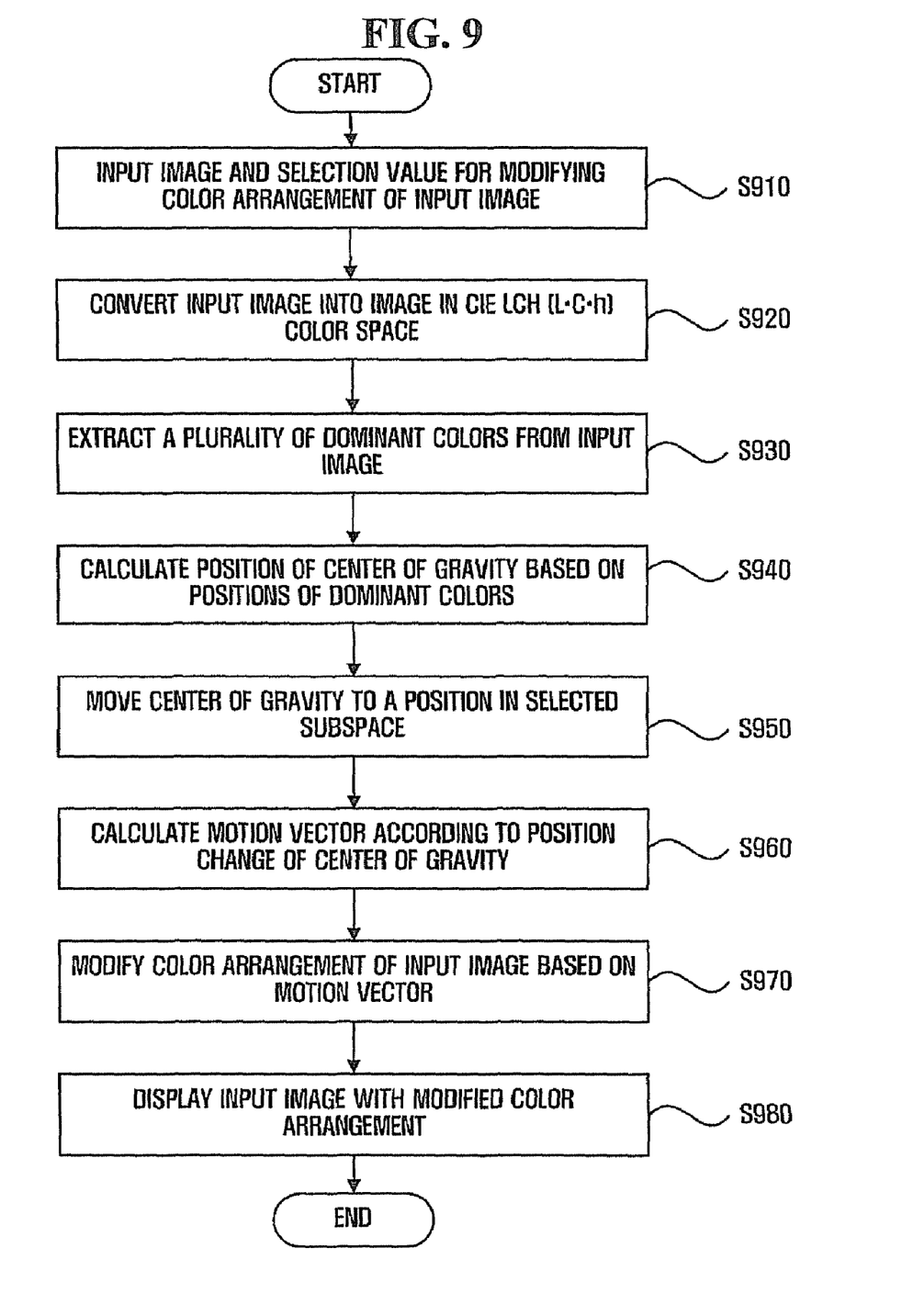
FIG. 9 is a flowchart illustrating a method of operating an apparatus for modifying an arrangement of colors according to an embodiment of the present invention.
Figure 10:
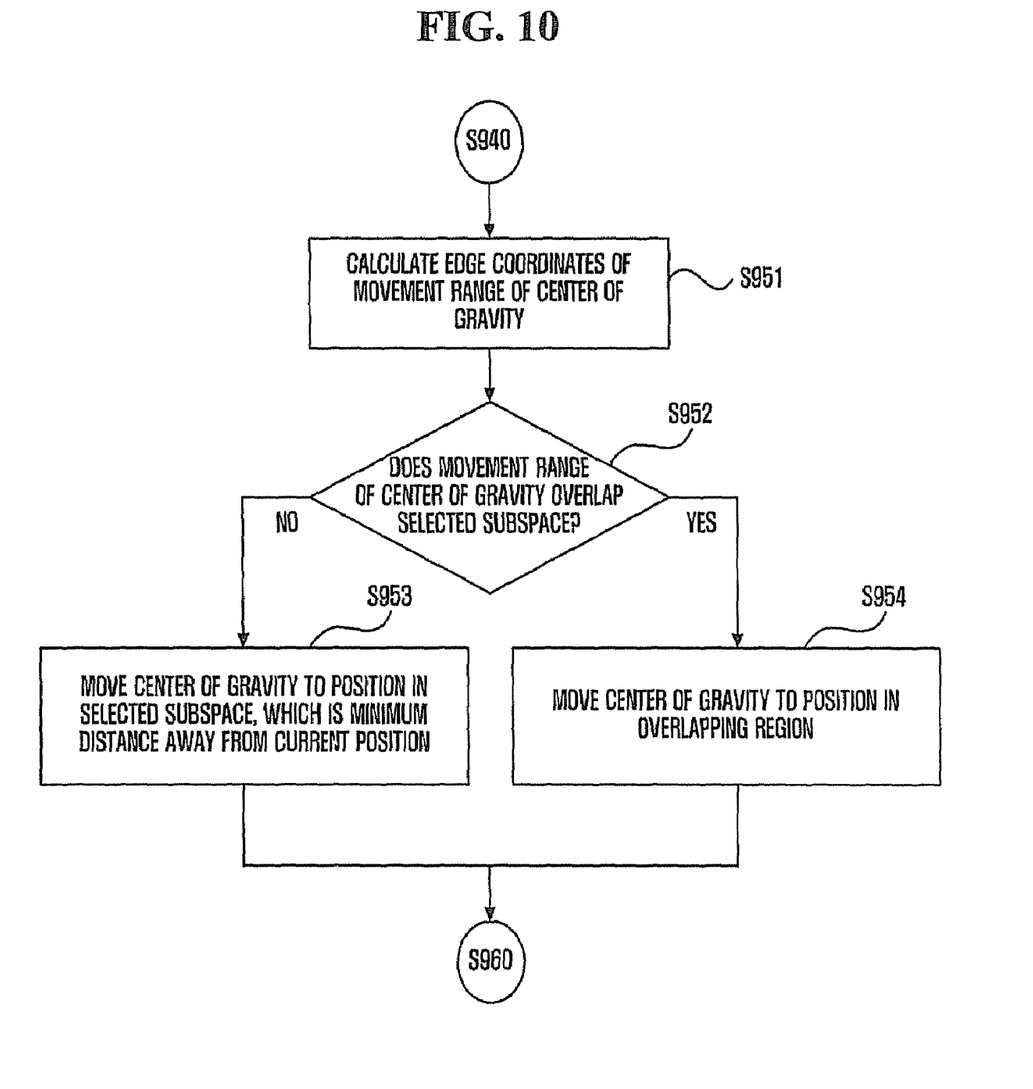
FIG. 10 is a flowchart illustrating operation S950 of FIG. 9 in more detail.

The operation of the apparatus for modifying an arrangement of colors 100 will now be described with reference to FIGS. 9 and 10. FIG. 9 is a flowchart illustrating a method of operating an apparatus for modifying an arrangement of colors according to an embodiment of the present invention. FIG. 10 is a flowchart illustrating operation S950 of FIG. 9 in more detail.

Referring to FIGS. 1 and 9, the input unit 110 receives an image containing color information and a selection value for modifying the color arrangement of the input image (for example, a selection value for a subspace) in operation S910. Here, a user may select the subspace by selecting an adjective item from a plurality of adjective items displayed on a user interface.

Figure 3:
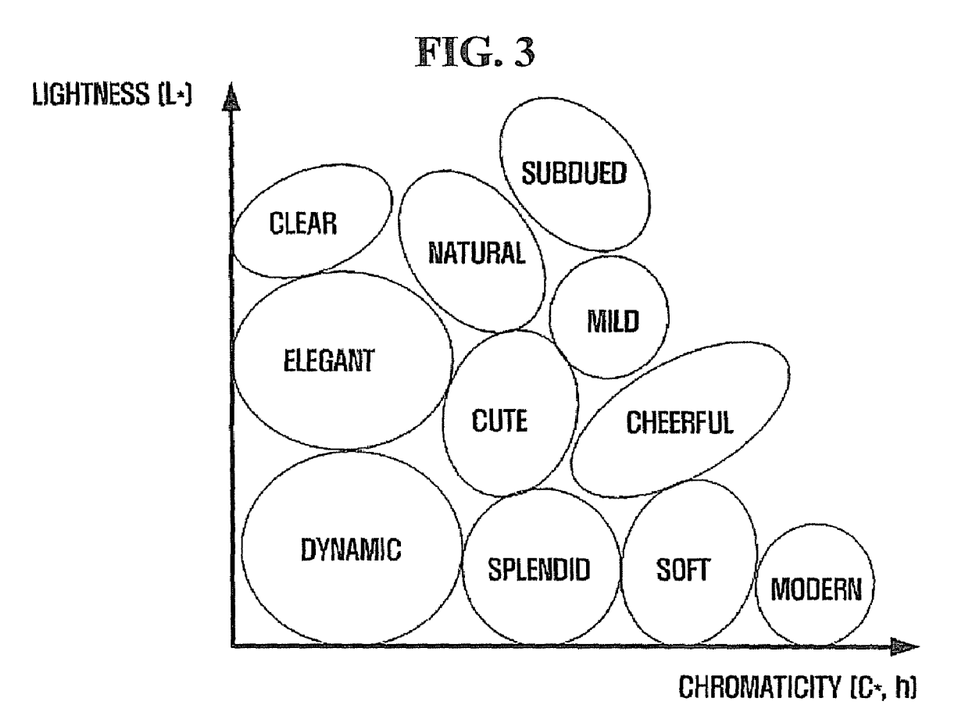
FIG. 3 illustrates a color space divided into a plurality of subspaces according to an embodiment of the present invention.

The conversion unit 130 then converts a signal format of the input image into a format (e.g., a CIE LCH (L*C*h) format) in which the input image is divided into a luminance signal and a color signal in operation S920. As described above, the CIE LCH color space represents red (R), green (G), and blue (B), which are three primary colors of light, as quantities of X, Y, and Z. As illustrated in FIG. 3, the CIE LCH color space may be divided into a plurality of subspaces respectively corresponding to a plurality of adjectives. In addition, the mapping table 400 (such as illustrated in FIG. 4) in which the adjectives and coordinate information of the subspaces corresponding to the adjectives are mapped may be stored in the storage unit 120 in advance.

Next, the extraction unit 140 analyzes a proportion of each color in the input image and extracts dominant colors from the input image based on the analysis result in operation S930. The extracting of the dominant colors may include an operation of creating a color histogram of the input image and an operation of extracting colors whose frequency of pixels is greater than a predetermined threshold value in the color histogram as dominant colors. Furthermore, the extracting of the dominant colors may include an operation of creating a color histogram of the input image and an operation of extracting a predetermined number of colors in order of highest frequency of pixels to lowest frequency of pixels as dominant colors.

Alternatively, the extracting of the dominant colors may include an operation of dividing the input image into a plurality of sub-regions, each including one or more pixels, and selecting a main color representing each sub-region in a color histogram of each sub-region, an operation of mapping the main color to each corresponding sub-region, and an operation of extracting a main color as a dominant color if a proportion of the entire input image occupied by sub-regions that have the main color and are arranged continuously is greater than a predetermined threshold rate (e.g., 10%). The main color may be selected using various methods. For example, a color having highest frequency of pixels among colors represented by respective sub-regions may be selected as a main color. Alternatively, a color corresponding to a median value of the colors represented by the respective sub-regions may be selected as the main color.

Dominant colors extracted in operation S930 are represented by coordinates in a color space. The coordinates represented in the color space may form a line segment, a figure, or a solid figure.

After the extraction unit 140 extracts dominant colors (operation S930), the center-of-gravity calculation unit 150 calculates a position of a center of gravity based on a position of each dominant color in the color space in operation S940. Here, the center-of-gravity calculation unit 150 may apply a weight to each dominant color according to a proportion of each dominant color in an entire region occupied by the dominant colors (as in Equation (1) provided above). For example, it is assumed that the extraction unit 140 has extracted first through third dominant colors and that proportions of the entire region occupied by the first through third dominant colors are 50%, 30% and 20%, respectively. In this case, if coordinates of the first through third dominant colors in the color space are $(X_1, Y_1, Z_1)$, $(X_2, Y_2, Z_2)$, and $(X_3, Y_3, Z_3)$, weights of 0.5, 0.3, and 0.2 are applied to X coordinates of the first through third dominant colors, respectively. Then, an X coordinate ($X_{COG}$) of the center of gravity is calculated based on a sum of the weighted X coordinates. Similarly, the center-of-gravity calculation unit 150 calculates a Y coordinate ($Y_{COG}$) of the center of gravity based on a sum of Y coordinates of the first through third dominant colors to which weights of 0.5, 0.3, and 0.2 have been respectively applied. In addition, the center-of-gravity calculation unit 150 calculates a Z coordinate ($Z_{COG}$) of the center of gravity based on a sum of Z coordinates of the first through third dominant colors to which weights of 0.5, 0.3, and 0.2 have been respectively applied.

Then, the center-of-gravity movement unit 160 moves the center of gravity to a position in the selected subspace in operation S950. Operation S950 will now be described in more detail with reference to FIG. 10.

FIG. 10 is a flowchart illustrating operation S950 of FIG. 9 in more detail. Referring to FIGS. 1 and 10, the center-of-gravity movement unit 160 calculates edge coordinates of a movement range of a center of gravity with respect to a current position of the center of gravity using information regarding the movement range in operation S951. After calculating the edge coordinates of the movement range, the center-of-gravity movement unit 160 can identify coordinates within the movement range with respect to the current position of the center of gravity.

Then, the center-of-gravity movement unit 160 determines a new position of the center of gravity based on whether the movement range of the center of gravity overlaps a selected subspace. Specifically, the center-of-gravity movement unit 160 determines whether there is an overlapping region between the movement range of the center of gravity and the selected subspace in operation S952.

If the center-of-gravity movement unit 160 determines that there is the overlapping region (operation S952), the center-of-gravity movement unit 160 moves the center of gravity to a position within the overlapping region in operation S954.

If the center-of-gravity movement unit 160 determines that there is no overlapping region (operation S952), the center-of-gravity movement unit 160 moves the center of gravity to a position in the selected subspace that is located a minimum distance away from a current position of the center of gravity in operation S953.

Referring back to FIG. 9, the parameter calculation unit 170 calculates a motion vector indicating a position change of the center of gravity in operation S960. The motion vector may be calculated using Equation (2) or (3) provided above. That is, if the new position of the center of gravity is located within the movement range, the motion vector may be calculated using Equation (2). If the new position of the center of gravity is located outside of the movement range, the motion vector may be calculated using Equation (3). The motion vector calculated in operation S960 is provided to the control unit 190.

In operation S970, the control unit 190 modifies the overall color arrangement of the input image by moving the position of each dominant color in the color space according to the parameter (i.e., the motion vector) provided by the parameter calculation unit 170. That is, the control unit 190 modifies the color arrangement of the input image by moving the position of each dominant color by the distance and in the direction that the center of gravity has moved.

The input image, having its color arrangement changed as described above, is displayed on the display unit 180 in operation S980.

As described above, an apparatus and method for modifying arrangement of colors according to aspects of the present invention provide the following and/or other advantages. First, the overall color arrangement of an input image can be modified according to a user preference, thereby satisfying the user. Furthermore, since the color arrangement of an input image is modified in consideration of color composition of the input image, an image with limited degree of freedom for color arrangement (such as an image of a natural object) can also have its color arrangement modified.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus modifying an arrangement of colors of an input image, the apparatus comprising:
   an extraction unit to extract one or more dominant colors from the input image;
   a center-of-gravity calculation unit to calculate a first position of a center of gravity in the input image based on a position of each dominant color in a color space;
   a parameter calculation unit to calculate a parameter for modifying a color arrangement of the input image based on the first position and a second position to which the center of gravity is moved from the first position according to a predetermined standard; and
   a control unit to modify the color arrangement of the input image according to the parameter, wherein
   the color space comprises a plurality of subspaces respectively corresponding to a plurality of adjectives,
   a specific subspace is selected by a user, and
   the second position is located within the specific subspace.

2. The apparatus as claimed in claim 1, further comprising: a conversion unit to divide the input image into a luminance signal and a color signal.

3. The apparatus as claimed in claim 2, wherein the conversion unit converts the input image into an image in a lightness, chroma, and hue (LCH) color space.

4. The apparatus as claimed in claim 1, wherein the extraction unit extracts one or more colors having a frequency of pixels greater than a predetermined threshold value as the one or more dominant colors.

5. The apparatus as claimed in claim 4, wherein the extraction unit extracts the one or more colors having the frequency of pixels greater than the predetermined threshold value in a color histogram of the input image.

6. The apparatus as claimed in claim 1, wherein the extraction unit extracts one or more colors having a highest frequency of pixels in the input image as the one or more dominant colors.

7. The apparatus as claimed in claim 1, wherein the extraction unit divides the input image into a plurality of sub-regions, each sub-region comprising one or more pixels, selects a main color representing each sub-region, and extracts the one or more dominant colors based on the main color of each sub-region.

8. The apparatus as claimed in claim 7, wherein, if a proportion of the input image occupied by continuously arranged sub-regions that have an identical main color is greater than a predetermined threshold rate, the extraction unit extracts the identical main color as the one or more dominant colors.

9. The apparatus as claimed in claim 1, wherein the center-of-gravity calculation unit applies a weight to each dominant color according to a proportion of each dominant color in the input image.

10. The apparatus as claimed in claim 1, wherein the control unit modifies the position of each dominant color to correspond to the second position of the center of gravity.

11. The apparatus as claimed in claim 1, further comprising:
a center-of-gravity movement unit to move the center of gravity from the first position to the second position, wherein the second position is located within the specific subspace.

12. The apparatus as claimed in claim 1, wherein the center of gravity has a predetermined movement range with respect to the first position.

13. The apparatus as claimed in claim 12, wherein the second position is located in an overlapping region of the movement range and the specific subspace.

14. The apparatus as claimed in claim 12, wherein the second position is located at a position in the specific subspace having a minimum distance from the first position if the movement range does not overlap the specific subspace.

15. The apparatus of claim 1, further comprising:
a display unit to display the input image with the modified color arrangement.

16. A method of modifying an arrangement of colors of an input image, the method comprising:
extracting one or more dominant colors from the input image;
calculating a first position of a center of gravity in the input image based on a position of each dominant color in a color space;
calculating a parameter for modifying a color arrangement of the input image based on the first position and a second position to which the center of gravity is moved from the first position according to a predetermined standard; and
modifying the color arrangement of the input image according to the parameter, wherein
the color space comprises a plurality of subspaces respectively corresponding to a plurality of adjectives,
a specific subspace is selected by a user, and
the second position is located within the specific subspace.

17. The method as claimed in claim 16, further comprising:
dividing the input image into a luminance signal and a color signal.

18. The method as claimed in claim 16, wherein the dividing of the input image comprises converting the input image into an image in a lightness, chroma, and hue (LCH) color space.

19. The method as claimed in claim 16, wherein the extracting of the one or more dominant colors comprises extracting one or more colors having a frequency of pixels greater than a predetermined threshold value as the one or more dominant colors.

20. The method as claimed in claim 19, wherein the extracting of the one or more colors having the frequency of pixels greater than the predetermined threshold value comprises extracting the one or more colors having the frequency of pixels greater than the predetermined threshold value in a color histogram of the input image.

21. The method as claimed in claim 16, wherein the extracting of the one or more dominant colors comprises extracting one or more colors having a highest frequency of pixels in the input image as the one or more dominant colors.

22. The method as claimed in claim 16, wherein the extracting of the one or more dominant colors comprises:
dividing the input image into a plurality of sub-regions, each sub-region comprising one or more pixels, and selecting a main color representing each sub-region; and
extracting the one or more dominant colors based on the main color of each sub-region.

23. The method as claimed in claim 22, where the extracting of the one or more dominant colors based on the main color of each sub-region comprises:
if a proportion of the input image occupied by continuously arranged sub-regions that have an identical main color is greater than a predetermined threshold rate, extracting the identical main color as the one or more dominant colors.

24. The method as claimed in claim 16, wherein the calculating of the first position comprises applying a weight to each dominant color according to a proportion of each dominant color in the input image.

25. The method as claimed in claim 16, wherein the modifying of the color arrangement of the input image comprises modifying the position of each dominant color to correspond to the second position of the center of gravity.

26. The method as claimed in claim 16, further comprising:
moving the center of gravity from the first position to the second position, wherein the second position is located within the specific subspace.

27. The method as claimed in claim 16, wherein the center of gravity has a predetermined movement range with respect to the first position.

28. The method as claimed in claim 27, wherein the second position is located in an overlapping region of the movement range and the specific subspace.

29. The method as claimed in claim 27, wherein the second position is located at a position in the specific subspace having a minimum distance from the first position if the movement range does not overlap the specific subspace.

30. The method as claimed in claim 16, further comprising:
displaying the input image with modified color arrangement.

31. A non-transitory computer readable recording medium encoded with the method of claim 16 implemented by a computer.

* * * * *

UNITED STATES PATENT AND TRADEMARK OFFICE
CERTIFICATE OF CORRECTION

| | | |
|---|---|---|
| PATENT NO. | : 7,953,273 B2 | Page 1 of 1 |
| APPLICATION NO. | : 11/782294 | |
| DATED | : May 31, 2011 | |
| INVENTOR(S) | : Gun-woo Nam et al. | |

It is certified that error appears in the above-identified patent and that said Letters Patent is hereby corrected as shown below:

Column 10, Line 59, In Claim 1, delete "adiectives," and insert -- adjectives, --, therefor.

Column 12, Line 30, In Claim 23, delete "where" and insert -- wherein --, therefor.

Signed and Sealed this
Fourteenth Day of February, 2012

David J. Kappos
*Director of the United States Patent and Trademark Office*